United States Patent
Matsumoto

(10) Patent No.: US 9,749,506 B2
(45) Date of Patent: Aug. 29, 2017

(54) IMAGE PROCESSING METHOD AND IMAGE PROCESSING DEVICE

(71) Applicant: PANASONIC INTELLECTUAL PROPERTY MANAGEMENT CO., LTD., Osaka (JP)

(72) Inventor: Kentaro Matsumoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 241 days.

(21) Appl. No.: 14/612,281

(22) Filed: Feb. 2, 2015

(65) Prior Publication Data
US 2015/0221071 A1 Aug. 6, 2015

(30) Foreign Application Priority Data

Feb. 5, 2014 (JP) .................. 2014-020038
Jan. 23, 2015 (JP) .................. 2015-011803

(51) Int. Cl.
*G06T 5/00* (2006.01)
*H04N 5/217* (2011.01)

(52) U.S. Cl.
CPC ........... *H04N 5/2176* (2013.01); *G06T 5/008* (2013.01); *G06T 2207/20016* (2013.01)

(58) Field of Classification Search
None
See application file for complete search history.

(56) References Cited

U.S. PATENT DOCUMENTS

| | | | |
|---|---|---|---|
| 7,755,670 B2 | 7/2010 | Utagawa | |
| 7,773,158 B2 | 8/2010 | Yamashita et al. | |
| 7,881,549 B2 | 2/2011 | Yamashita et al. | |
| 8,311,357 B2 | 11/2012 | Yamashita et al. | |
| 2007/0080975 A1 | 4/2007 | Yamashita et al. | |
| 2007/0115369 A1 | 5/2007 | Utagawa | |
| 2009/0167901 A1* | 7/2009 | Aragaki | H04N 1/409 348/241 |
| 2009/0232401 A1 | 9/2009 | Yamashita et al. | |
| 2010/0002104 A1* | 1/2010 | On | G06T 5/007 348/252 |

(Continued)

FOREIGN PATENT DOCUMENTS

| | | |
|---|---|---|
| JP | 2007-151094 A | 6/2007 |
| JP | 2007-312349 A | 11/2007 |

(Continued)

*Primary Examiner* — Bernard Krasnic
(74) *Attorney, Agent, or Firm* — McDermott Will & Emery LLP

(57) ABSTRACT

An image processing method includes: (a) generating coefficients corresponding to pixels of a reduced image; (b) generating coefficients corresponding to pixels of an original image from the coefficients corresponding to the pixels of the reduced image, to expand the coefficients corresponding to the pixels of the reduced image to the coefficients corresponding to the pixels of the original image; and (c) multiplying pixel values by coefficients to correct the original image, wherein in step (b), the coefficients corresponding to the pixels of the original image are generated such that a spatial change of the coefficients corresponding to the pixels of the original image is caused according to a boundary between a bright portion and a dark portion, the spatial change occurring mainly on a dark side of the boundary.

4 Claims, 13 Drawing Sheets

(56) References Cited

U.S. PATENT DOCUMENTS

| | | |
|---|---|---|
| 2010/0290714 A1 | 11/2010 | Toyoda et al. |
| 2011/0085085 A1 | 4/2011 | Yamashita et al. |
| 2014/0152686 A1* | 6/2014 | Narasimha ............. G09G 5/377 345/589 |
| 2014/0152694 A1* | 6/2014 | Narasimha ............. G09G 5/377 345/629 |

FOREIGN PATENT DOCUMENTS

| | | |
|---|---|---|
| JP | 2012-027547 A | 2/2012 |
| JP | 2013-127804 A | 6/2013 |
| WO | 2007/043460 A1 | 4/2007 |
| WO | 2009/107197 A1 | 9/2009 |

* cited by examiner

IMAGE PROCESSING METHOD AND IMAGE PROCESSING DEVICE

CROSS REFERENCE TO RELATED APPLICATIONS

The present application is based on and claims priority of Japanese Patent Application No. 2014-020038 filed on Feb. 5, 2014, and Japanese Patent Application No. 2015-11803 filed on Jan. 23, 2015, The entire disclosures of the above-identified applications, including the specifications, drawings and claims are incorporated herein by reference in their entirety.

FIELD

The present disclosure relates to an image processing method for correcting the brightness of an original image on a pixel-by-pixel basis.

BACKGROUND

Patent Literature (PTL) 1 discloses a vision processing device. According to this vision processing device, a vision processing unit outputs a first gain signal having a certain gain characteristic with respect to an image signal, and the image signal input to the vision processing device is corrected based on the first gain signal. Accordingly, correction processing can be performed with high accuracy, using a simple configuration.

CITATION LIST

Patent Literature

[PTL 1] Japanese Unexamined Patent Application Publication No. 2007-312349

SUMMARY

Technical Problem

The present disclosure provides an image processing method for achieving both reduction in the amount of processing of generating coefficients for correcting an original image and inhibition of deterioration in image quality caused by the reduction in the amount of processing.

Solution to Problem

An image processing method according to the present disclosure is an image processing method for correcting, on a pixel-by-pixel basis, brightness of an original image which includes pixels that have greater pixel values when the pixels have higher brightness, the image processing method including: (a) generating coefficients corresponding to pixels of a reduced image of the original image by generating a greater coefficient for each of the pixels of the reduced image when a portion surrounding the pixel of the reduced image is darker; (b) generating coefficients corresponding to the pixels of the original image from the coefficients corresponding to the pixels of the reduced image, to expand the coefficients corresponding to the pixels of the reduced image to the coefficients corresponding to the pixels of the original image; and (c) multiplying, for each of the pixels of the original image, a pixel value of the pixel of the original image by one of the coefficients corresponding to the pixel of the original image, to correct the pixel values of the pixels of the original image, wherein in step (b), the coefficients corresponding to the pixels of the original image are generated such that a spatial change of the coefficients corresponding to the pixels of the original image is caused according to a boundary between a bright portion and a dark portion included in the original image, the spatial change occurring mainly on a dark side of the boundary.

Advantageous Effects

An image processing method according to the present disclosure can achieve both reduction in the amount of processing of generating coefficients for correcting an original image and inhibition of deterioration in image quality caused by the reduction in the amount of processing.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DESCRIPTION OF EMBODIMENTS

The following describes non-limiting embodiments in detail, with reference to the drawings as appropriate. However, unnecessarily detailed description may be omitted. For example, a detailed description of a matter already known well and redundant description of substantially the same configuration may be omitted. This is intended to prevent the following description from being unnecessarily redundant and facilitate understanding of a person skilled in the art.

It should be noted that the inventor provides the accompanying drawings and the following description, in order that a person skilled in the art sufficiently understands the present disclosure, and thus does not intend to limit a subject matter in the claims with the drawings and description.

Embodiment 1

The following describes a present non-limiting embodiment with reference to FIGS. 1 to 10.

[1-1. Configuration]

Figure 1:
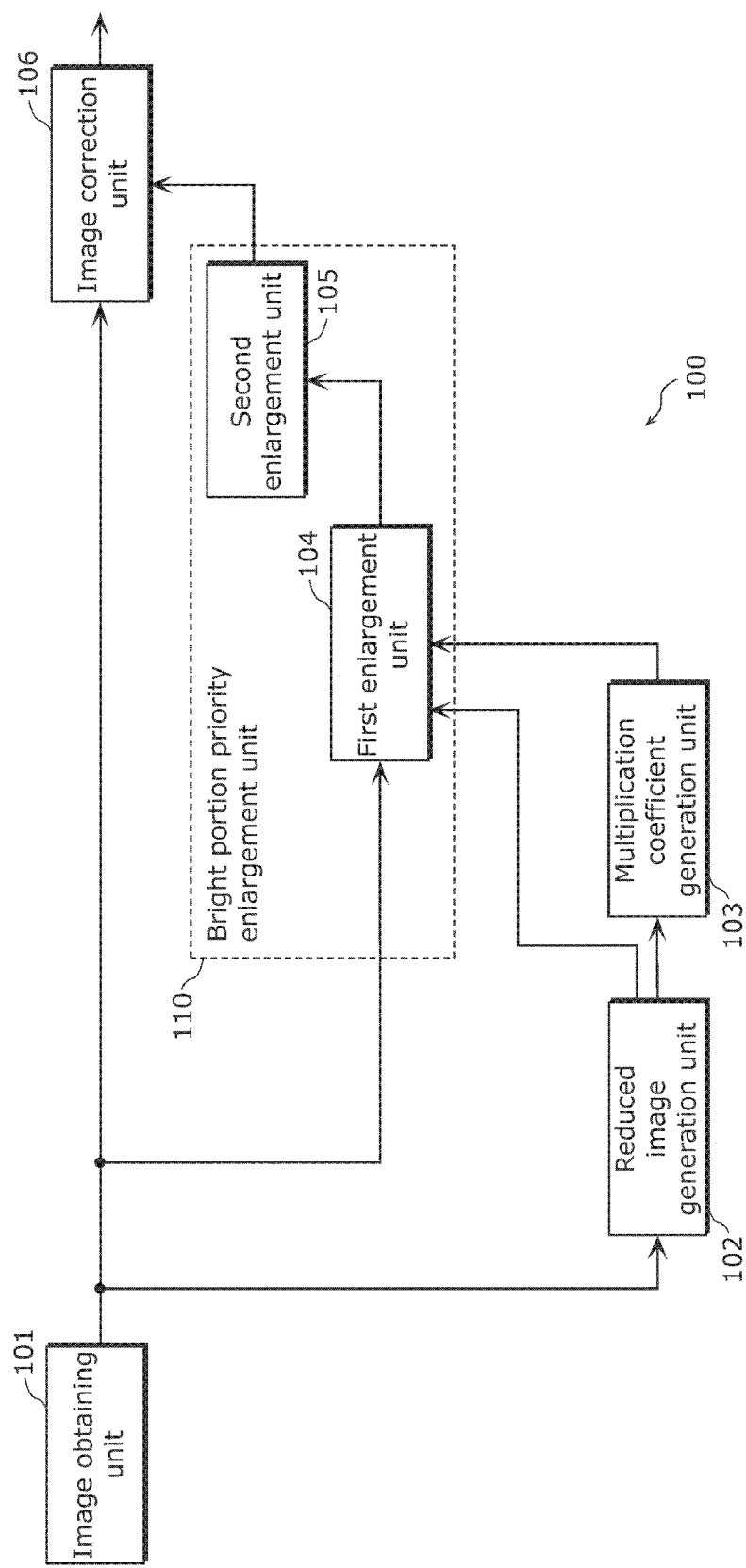
FIG. 1 is a configuration diagram illustrating a specific example of an image processing device according to Embodiment 1.

FIG. 1 is a configuration diagram illustrating a specific example of an image processing device according to the present embodiment. An image processing device 100 illustrated in FIG. 1 includes an image obtaining unit 101, a reduced image generation unit 102, a multiplication coefficient generation unit 103, a first enlargement unit 104, a second enlargement unit 105, and an image correction unit 106. The first enlargement unit 104 and the second enlargement unit 105 form a bright portion priority enlargement unit 110. The bright portion priority enlargement unit 110 may be expressed as an expansion unit.

The image obtaining unit 101 obtains an image as an original image. For example, the image obtaining unit 101 obtains an original image from a recording medium connected to the image processing device 100. This original image may be a picture included in a video stream or a still image. The following describes a picture included in a video stream as an original image which is to be processed, in order to facilitate a description.

Specifically, the image obtaining unit 101 obtains, as an original image, a picture at a certain time included in an input video stream. It should be noted that processing of decoding a video stream may be executed by the image processing device 100 or by an external device. In the latter case, the image obtaining unit 101 obtains a video stream on which decoding processing has been performed.

Here, an image includes a plurality of pixels. A pixel has a pixel value related to the brightness of the pixel. For example, the higher brightness a pixel has, the greater pixel value the pixel has, whereas the lower brightness a pixel has, the smaller pixel value the pixel has. Accordingly, a pixel value may be expressed as having high brightness if a pixel value is large, and a pixel value may be expressed as having low brightness if a pixel value is small. A pixel value may be a luminance value, a component of an RGB value, or a component of a YUV value.

The reduced image generation unit 102 reduces an image. For example, the reduced image generation unit 102 decreases the number of pixels of the original image obtained by the image obtaining unit 101, to generate a reduced image.

Specifically, the reduced image generation unit 102 performs low pass filter processing and subsampling processing, to generate a reduced image having no aliasing. For example, if the original image has 1920×1080 pixels, the reduced image generation unit 102 reduces this original image into an image having ⅛ pixels both horizontally and vertically, to generate a reduced image having 240×135 pixels.

It should be noted that when generating a reduced image, the reduced image generation unit 102 may generate a reduced image having the same aspect ratio as that of an original image, or a reduced image having a different aspect ratio. In other words, a designer can freely set the number of pixels and the aspect ratio of a reduced image.

The reduced image generation unit 102 outputs the reduced image obtained by reducing the original image, to the multiplication coefficient generation unit 103 and the first enlargement unit 104.

Although the above describes filter processing as a method for generating a reduced image, the reduced image generation unit 102 calculates (computes) an average value of pixel values of an original image for each one of pixels of a reduced image, and generate the average value as a pixel value of that pixel of the reduced image.

The multiplication coefficient generation unit 103 is a generation unit which generates a multiplication coefficient. Specifically, the multiplication coefficient generation unit 103 calculates a multiplication coefficient for each of pixels of the reduced image, based on a pixel value of the pixel of the reduced image and a pixel value of a pixel located in a portion surrounding the pixel, to generate multiplication coefficients corresponding to the pixels of the reduced image.

The multiplication coefficients generated by the multiplication coefficient generation unit 103 are coefficients for correcting, among pixels of the original image, pixel values of pixels corresponding to pixels of the reduced image. Such a multiplication coefficient may be considered to be a coefficient for correcting a pixel value of a pixel of the reduced image. In addition, the multiplication coefficient may be expressed as a gain. Furthermore, multiplication coefficients corresponding to pixels of an image may correspond to the image, and may be expressed as a gain map. Such multiplication coefficients may be expressed also as a coefficient map, a coefficient matrix, or coefficient data.

As described above, such a multiplication coefficient is generated for each pixel included in the reduced image. Then, multiplication coefficients that are the same in number as the pixels of the reduced image are expanded by the next processing, to generate multiplication coefficients that are the same in number as pixels of the original image.

Figure 2:
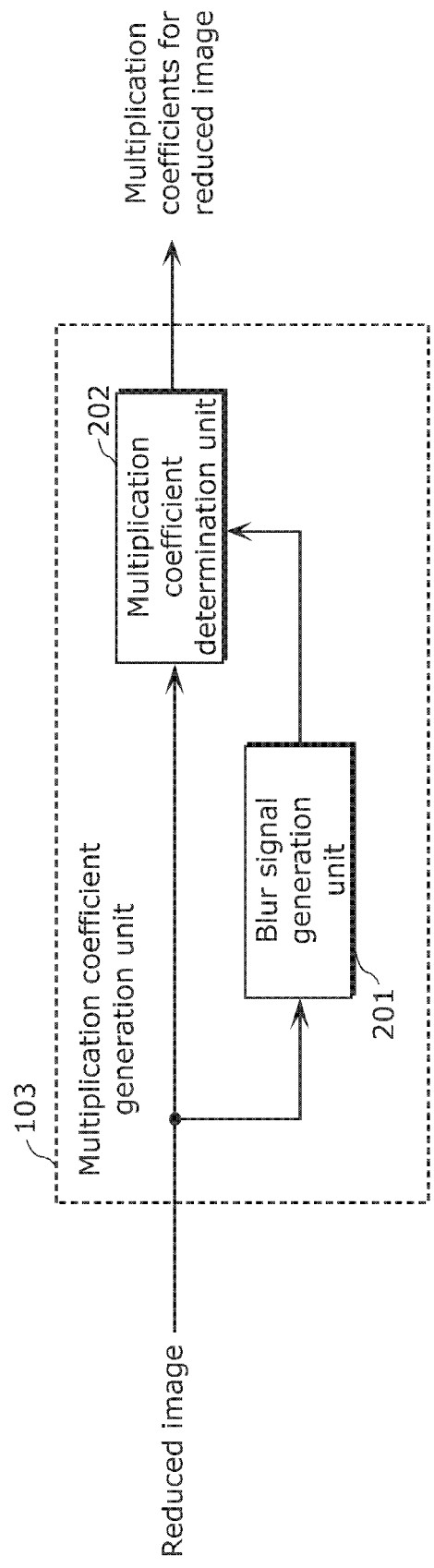
FIG. 2 is a configuration diagram illustrating a specific example of a multiplication coefficient generation unit according to Embodiment 1.

FIG. 2 is a configuration diagram illustrating a specific example of the multiplication coefficient generation unit 103 illustrated in FIG. 1, and is an explanatory diagram of a specific example of generating multiplication coefficients from a reduced image input to the multiplication coefficient generation unit 103. For example, the multiplication coefficient generation unit 103 includes a blur signal generation unit 201 and a multiplication coefficient determination unit 202, as illustrated in FIG. 2.

The blur signal generation unit 201, for each pixel of a reduced image, combines a pixel value of the pixel and pixel values of pixels located in a portion surrounding the pixel, to generate a blur signal. A blur signal includes information indicating the lightness of a current pixel to be processed and a portion surrounding the current pixel (in other words, average brightness of the current pixel and the portion surrounding the current pixel).

Here, a surrounding portion defines a range, the length of which corresponds to one pixel or a predetermined number of pixels, for example. Pixels located in a portion surrounding a current pixel to be processed may adjoin the current pixel. Here, although a pixel value of a current pixel to be processed is used to generate a blur signal, only pixel values of pixels located in a portion surrounding the current pixel may be used. Furthermore, a position of a pixel may correspond to the center of the pixel or the upper left corner of the pixel, for instance.

Specifically, the blur signal generation unit 201 performs filter processing on pixel values (for example, luminance values) of a current pixel to be processed and pixels located in a portion surrounding the current pixel, using a two-dimensional low pass filter or one-dimensional low pass filter, for instance. Then, the blur signal generation unit 201 outputs a blur signal obtained by filter processing, to the multiplication coefficient determination unit 202.

The multiplication coefficient determination unit 202, for each pixel of the reduced image, determines a multiplication coefficient based on a pixel value of the pixel and a blur signal corresponding to the pixel, to generate multiplication coefficients that are the same in number as pixels of the reduced image. For example, if the reduced image has 240×135 pixels, 240×135 multiplication coefficients are generated.

Specifically, the multiplication coefficient determination unit 202 generates a multiplication coefficient from a pixel value of the reduced image and a blur signal, using a two-dimensional look-up table (LUT). Here, a two-dimensional LUT is a table for determining a multiplication coefficient based on a pixel value of a reduced image and a blur signal. Accordingly, the two-dimensional LUT defines a multiplication coefficient corresponding to a pixel value of a reduced image and a blur signal.

For example, the two-dimensional LUT includes a plurality of tables each showing the correspondence between pixel values and multiplication coefficients. The multiplication coefficient determination unit 202 selects a table from among the plurality of tables, using the blur signal input from the blur signal generation unit 201. Then, the multiplication coefficient determination unit 202 determines a multiplication coefficient corresponding to a pixel value of the reduced image, with reference to the selected table, to generate a multiplication coefficient. It should be noted that a function for determining a multiplication coefficient based on a pixel value of a reduced image and a blur signal may be used for a two-dimensional LUT.

For example, the multiplication coefficient determination unit 202 generates a multiplication coefficient for correcting a dark portion. Correction of a dark portion is for brightening a dark area (dark portion), and corresponds to human visual characteristics. Such correction of a dark portion may be combined with correction of a bright portion for darkening a bright area (bright portion).

A person has visual characteristics which unconsciously convert information that comes into eyes. The two-dimensional LUT used by the multiplication coefficient determination unit 202 represents, in simple, conversion characteristics similar to visual characteristics called brightness contrast or color contrast, in particular. Specifically, even when brightness is physically the same, if a surrounding portion is bright, the same brightness is perceived to be rather dark, whereas if a surrounding portion is dark, the same brightness is perceived to be rather bright. Such visual characteristics are called brightness contrast.

The multiplication coefficient determination unit 202 generates multiplication coefficients corresponding to such visual characteristics, in order to improve subjective image quality. In particular, the multiplication coefficient determination unit 202 generates a multiplication coefficient using a blur signal on which one or more pixel values in a surrounding portion are reflected, in order to inhibit contrast from disappearing due to correction. Accordingly, an appropriate multiplication coefficient is generated, thus inhibiting disappearance of contrast.

The first enlargement unit 104 generates, from the multiplication coefficients corresponding to pixels of the reduced image, multiplication coefficients corresponding to pixels of an intermediate image, to enlarge the multiplication coefficients corresponding to the pixels of the reduced image to the multiplication coefficients corresponding to the pixels of the intermediate image. The intermediate image has pixels greater in number than pixels of the reduced image and smaller in number than pixels of the original image.

Here, enlarging multiplication coefficients does not mean a change of multiplication coefficients to greater coefficients, but rather mean an increase in the number of multiplication coefficients. Therefore, "enlarge" may be expressed as "expand".

In other words, the first enlargement unit 104 generates a gain map of the intermediate image from a gain map of the reduced image, to enlarge the gain map of the reduced image to the gain map of the intermediate image. Furthermore, to put it another way, the first enlargement unit 104 develops multiplication coefficients corresponding to pixels of the reduced image into multiplication coefficients corresponding to pixels of the intermediate image. A description of specific processing by the first enlargement unit 104 is given below.

The second enlargement unit 105 generates, from the multiplication coefficients corresponding to pixels of the intermediate image, multiplication coefficients corresponding to pixels of the original image, to enlarge the multiplication coefficients corresponding to the pixels of the intermediate image to the multiplication coefficients corresponding to the pixels of the original image. The multiplication coefficients corresponding to pixels of the original image are multiplication coefficients for correcting pixel values of pixels of the original image.

Specifically, for example, the second enlargement unit 105 enlarges multiplication coefficients by enlargement processing in which bilinear interpolation (linear interpolation) is used. As another method, the second enlargement unit 105 enlarges multiplication coefficients by enlargement processing in which nearest neighbor interpolation is used. Furthermore, as another method, the second enlargement unit 105 enlarges multiplication coefficients by enlargement processing in which bicubic interpolation is used.

The image correction unit 106 is a correction unit which corrects an original image. For example, the image correction unit 106 corrects a dark portion or a bright portion of the original image. Specifically, the image correction unit 106 multiplies one of multiplication coefficients generated for pixels included in the original image by a pixel value of a corresponding pixel, to correct the pixel value of the pixel.

For example, the image correction unit 106 generates a pixel value ($X_{out}$) obtained by multiplying a multiplication coefficient (g) by a pixel value ($X_{in}$) of the original image, as shown in Expression 1. The image correction unit 106 generates an image which includes the generated pixel value ($X_{out}$), to correct the original image.

$$X_{out} = gX_{in} \qquad \text{(Expression 1)}$$

More specifically, the image correction unit 106 performs correction processing on a component of an RGB value as a pixel value of an original image. It should be noted that, as another method, the image correction unit 106 may perform correction processing on a component of a YUV value as a pixel value of an original image.

The following describes a specific operation by the first enlargement unit 104, with reference to the drawings.

Figure 3:
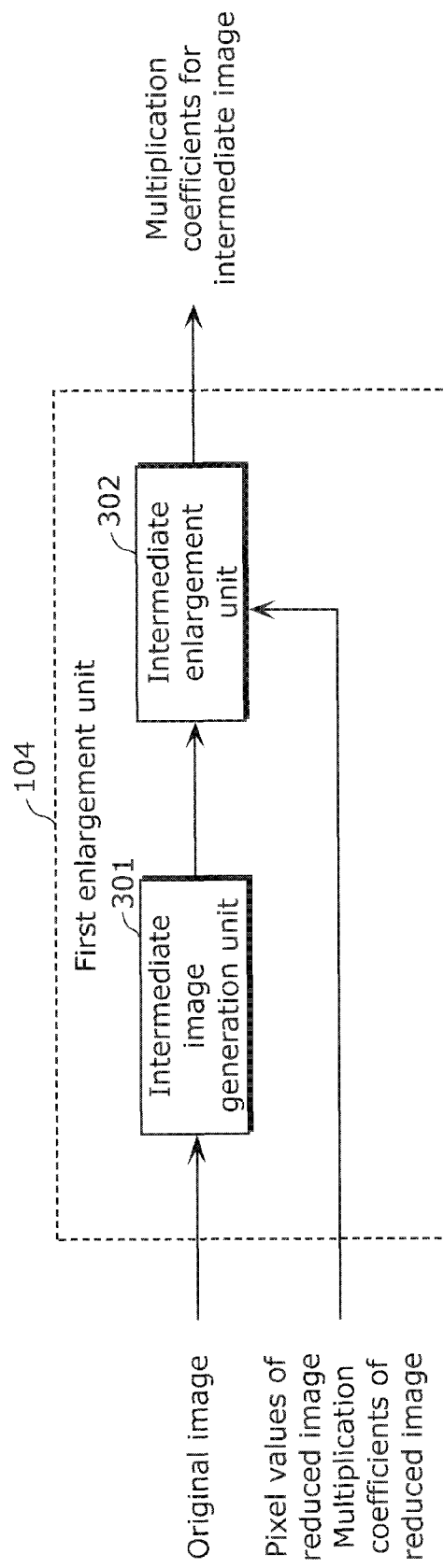
FIG. 3 is a configuration diagram illustrating a specific example of a first enlargement unit according to Embodiment 1.

FIG. 3 is a configuration diagram illustrating a specific example of the first enlargement unit 104 illustrated in FIG. 1.

As illustrated in FIG. 3, the first enlargement unit 104 includes an intermediate image generation unit 301 and an intermediate enlargement unit 302.

The intermediate image generation unit 301 reduces the original image, to generate an intermediate image having more pixels than the reduced image.

Specifically, the intermediate image generation unit 301 reduces the original image to an image having pixels that are the same in number as multiplication coefficients generated by the intermediate enlargement unit 302 enlarging multiplication coefficients of the reduced image. For example, if the intermediate enlargement unit 302 outputs 480×270 multiplication coefficients corresponding to 480×270 pixels, the intermediate image generation unit 301 reduces the original image to the intermediate image having 480×270 pixels.

The intermediate enlargement unit 302 generates a new multiplication coefficient for each pixel of the intermediate image generated by the intermediate image generation unit 301, using information on the pixel of the intermediate image, information on a reference pixel corresponding to the pixel of the intermediate image among pixels of the reduced image, and a multiplication coefficient corresponding to the reference pixel. This allows the intermediate enlargement unit 302 to enlarge multiplication coefficients corresponding to pixels of the reduced image, and generates multiplication coefficients corresponding to pixels of the intermediate image.

Figure 4:
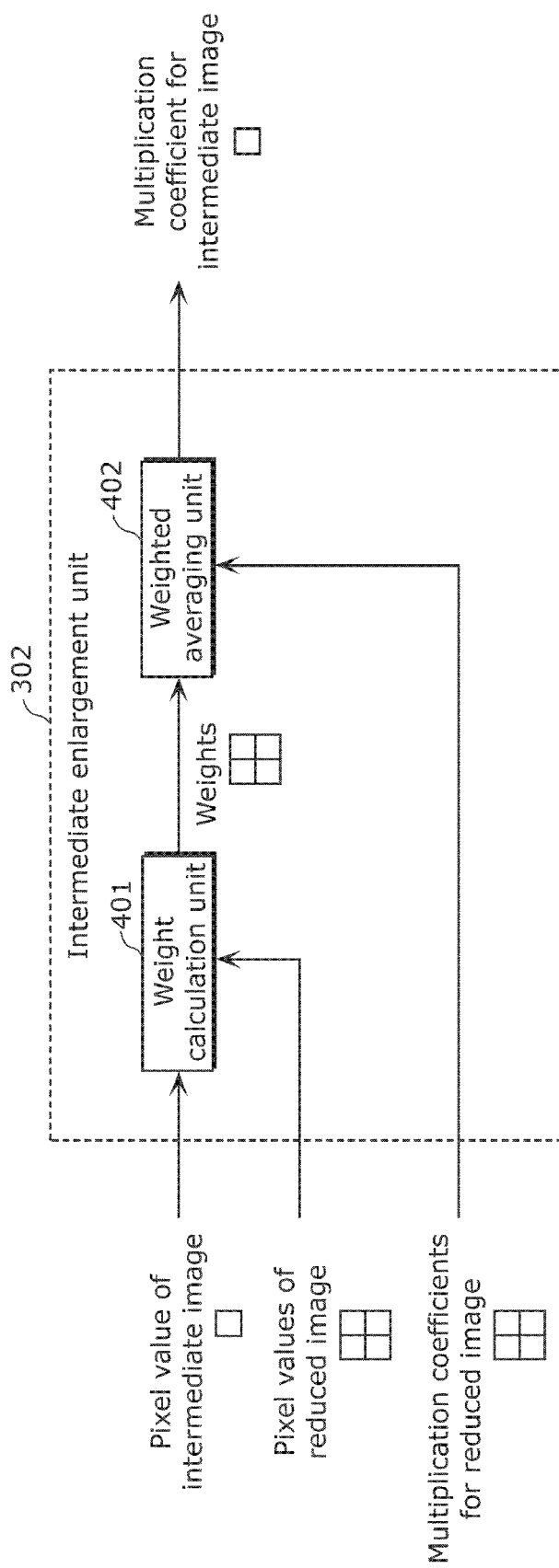
FIG. 4 is a configuration diagram illustrating a specific example of an intermediate enlargement unit according to Embodiment 1.

The following describes enlargement processing by the intermediate enlargement unit 302, with reference to FIG. 4.

FIG. 4 is a configuration diagram illustrating a specific example of the intermediate enlargement unit 302 illustrated in FIG. 3, and is an explanatory diagram of enlargement processing by the intermediate enlargement unit 302.

Figure 5:
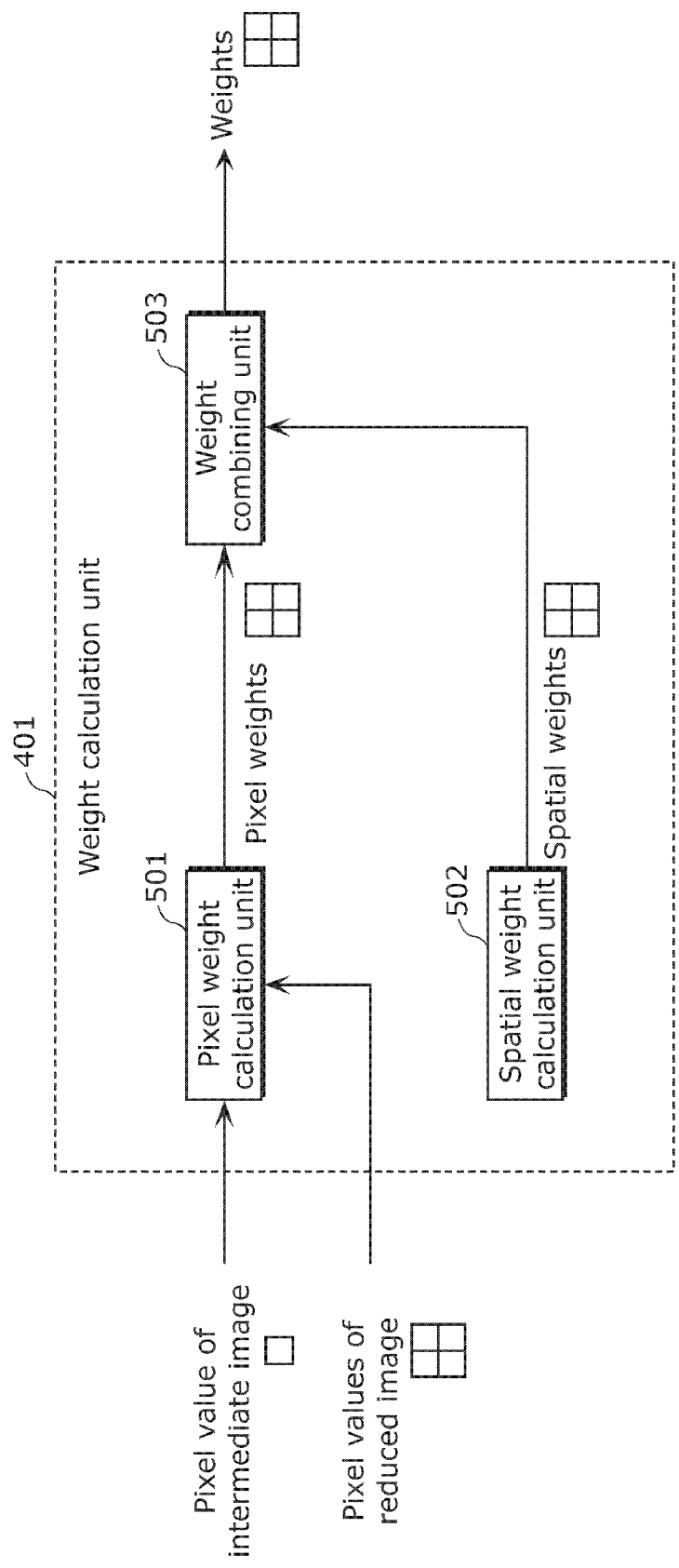
FIG. 5 is a configuration diagram illustrating a specific example of a weight calculation unit according to Embodiment 1.

The following describes a specific processing method used by the intermediate enlargement unit 302, with reference to FIGS. 4 and 5. To facilitate a description, here, the intermediate enlargement unit 302 refers to 2×2 pixels, namely 4 pixels, included in the reduced image, when generating a multiplication coefficient for one pixel of the intermediate image generated by the intermediate image generation unit 301. Each of the 2×2 pixels, namely 4 pixels, is a reference pixel corresponding to one pixel of the intermediate image, and is one of pixels of the reduced image at relatively the same position as a position of the pixel of the intermediate image or one of pixels of the reduced image which is located in a portion surrounding the relatively same position.

The intermediate enlargement unit 302 includes a weight calculation unit 401 and a weighted averaging unit 402.

The weight calculation unit 401 obtains a pixel value of one pixel of the intermediate image from the intermediate image generation unit 301, and four pixel values of 2×2 pixels of the reduced image from the reduced image generation unit 102. The weight calculation unit 401 compares the pixel value of the pixel of the intermediate image with each of the four pixel values of the 2×2 pixels of the reduced image, to calculate weights. Here, one pixel of the intermediate image is expressed by pixel n, and 2×2 pixels of a reduced image are expressed by pixel $m_0$, pixel $m_1$, pixel $m_2$, and pixel $m_3$.

When generating a correction value of pixel n of the intermediate image, the intermediate enlargement unit 302 refers to information on pixels $m_0$, $m_1$, $m_2$, and $m_3$ of the reduced image.

FIG. 5 is a configuration diagram illustrating a specific example of the weight calculation unit 401 illustrated in FIG. 4, and is an explanatory diagram of an example of weight calculation processing by the weight calculation unit 401. The weight calculation unit 401 in FIG. 5 includes a pixel weight calculation unit 501, a spatial weight calculation unit 502, and a weight combining unit 503. The weight calculation unit 401 compares pixel n of the intermediate image with each of four pixels $m_0$, $m_1$, $m_2$, and $m_3$ of the reduced image, and calculates weights for four pixels $m_0$, $m_1$, $m_2$, and $m_3$.

Figure 6:
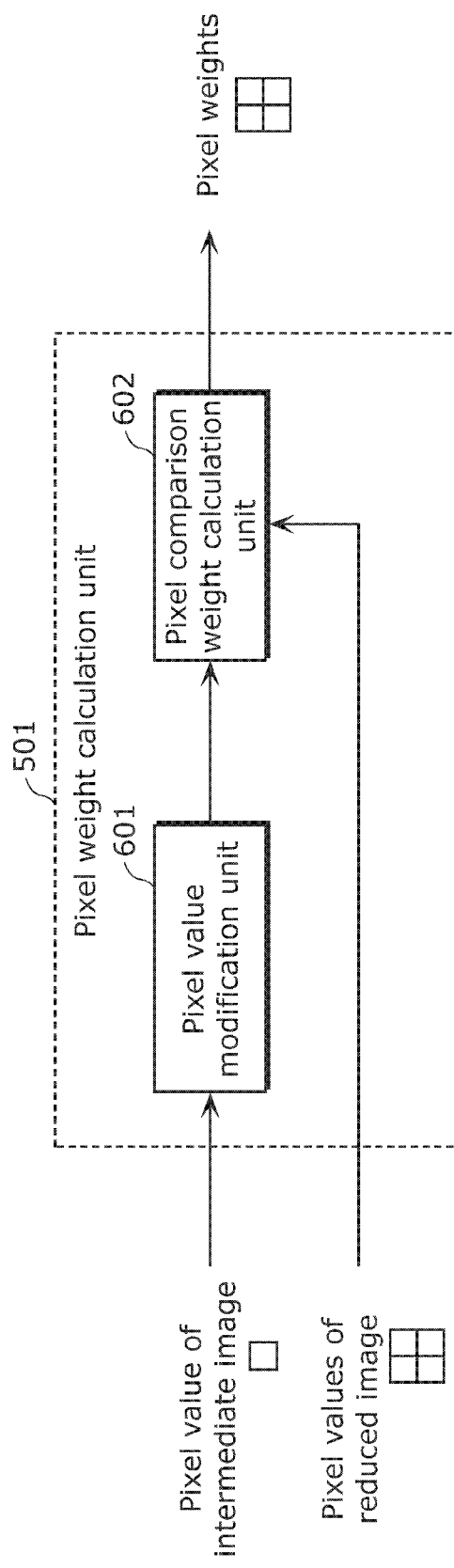
FIG. 6 is a configuration diagram illustrating a specific example of a pixel weight calculation unit according to Embodiment 1.

FIG. 6 is a configuration diagram illustrating a specific example of the pixel weight calculation unit 501 illustrated in FIG. 5, and is an explanatory diagram of an example of pixel weight calculation processing by the pixel weight calculation unit 501. The pixel weight calculation unit 501 illustrated in FIG. 6 includes a pixel value modification unit 601 and a pixel comparison weight calculation unit 602. The pixel value modification unit 601 changes a pixel value (for example, luminance value) of a pixel of the intermediate image to a pixel value indicating higher brightness than original brightness. Specifically, the pixel value modification unit 601 changes a pixel value to a pixel value indicating higher brightness than the original brightness, using a primary function as shown by Expression 2.

$$X(n)=aY(n)+b \qquad \text{(Expression 2)}$$

In Expression 2, Y(n) denotes a pixel value of pixel n not changed yet, and X(n) denotes a pixel value of pixel n changed. For example, a denotes a numerical value of 1 or more, and b denotes a numerical value of 0 or more. However, pixel value modification processing is not limited to this calculation formula. The pixel value modification unit 601 may perform pixel value modification processing using a secondary function, a third function, or gamma conversion, for example.

A pixel value of the intermediate image is changed to indicate higher brightness as described above, so that multiplication coefficients to be obtained by subsequent processing are generated being influenced more by pixel values of pixels located on a bright side of a boundary between bright and dark portions of the original image than by pixel values of pixels located on a dark side of the boundary between bright and dark portions of the original image.

The pixel comparison weight calculation unit 602 compares the changed pixel value of pixel n with each of four pixel values of four pixels $m_0$, $m_1$, $m_2$, and $m_3$. The pixel comparison weight calculation unit 602 calculates weights (pixel weights) such that the closer two compared pixel values are, the greater a weight is, and the more distant two compared pixel values are, the smaller a weight is. Specifically, the pixel comparison weight calculation unit 602 calculates pixel weights using Expression 3.

$$W_p(k)=W_{max}-ABS(X(n)-X(m_k)) \qquad \text{(Expression 3)}$$

Here, X(n) denotes a changed pixel value of pixel n. $X(m_k)$ denotes a pixel value of pixel $m_k$ (k is 0 to 3) of a reduced image. $W_p(k)$ denotes a pixel weight of pixel $m_k$. $W_{max}$ denotes a given value set so as to prevent a pixel weight from having a negative value. ABS(x) denotes an absolute value of x.

The pixel comparison weight calculation unit 602 calculates a pixel weight using Expression 3, and thus can calculate pixel weight $W_p(k)$ so as to increase a weight if a pixel value of pixel $m_k$ is close to the changed pixel value of pixel n, and decrease a weight if a pixel value of pixel $m_k$ is distant from the changed pixel value of pixel n.

Furthermore, the pixel comparison weight calculation unit 602 may calculate pixel weights, using Expression 4 which is another pixel weight calculating method. Expression 4 corresponds to a Gaussian function, and $\sigma^2$ denotes dispersion.

[Math 1]

$$W_s(k) = \frac{1}{\sqrt{2\pi\sigma^2}} \exp\left(-\frac{(X(n) - X(m_k))^2}{2\sigma^2}\right) \quad \text{(Expression 4)}$$

The pixel value modification unit 601 changes pixel n to have higher brightness, so that a weight of a pixel having a higher brightness among pixels m0, m1, m2, and m3 is increased.

Figure 7:
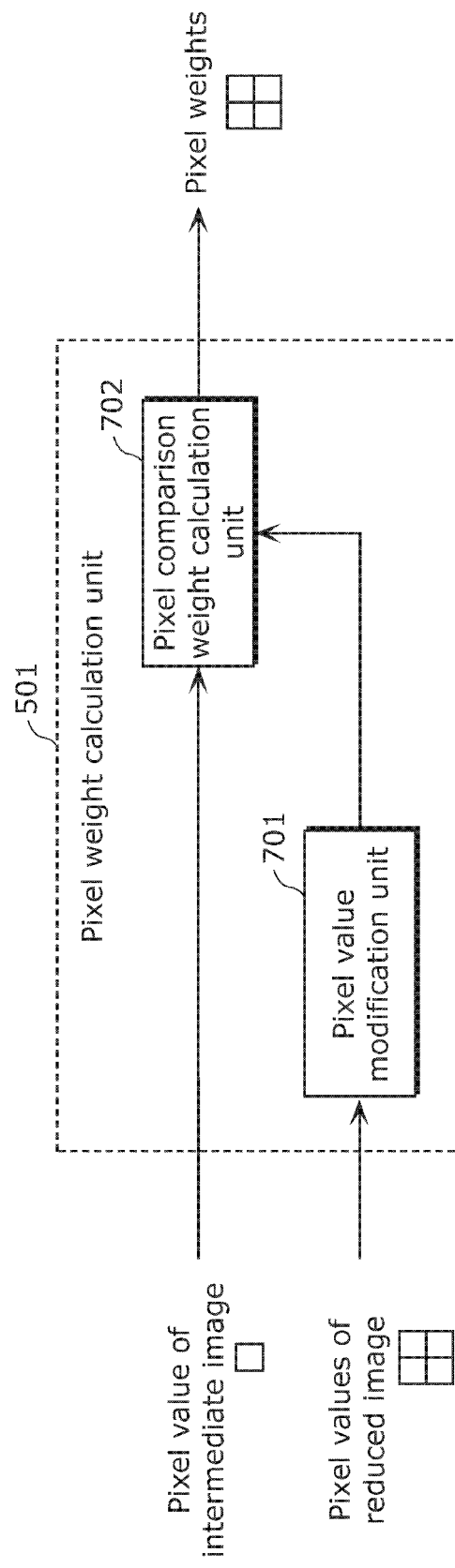
FIG. 7 is a configuration diagram illustrating a variation of the pixel weight calculation unit according to Embodiment 1.

FIG. 7 is a configuration diagram illustrating a variation of the pixel weight calculation unit 501 illustrated in FIG. 5, and is an explanatory diagram of a different example of pixel weight calculation processing by the pixel weight calculation unit 501. The pixel weight calculation unit 501 illustrated in FIG. 7 includes a pixel value modification unit 701 and a pixel comparison weight calculation unit 702.

The pixel value modification unit 701 changes pixel values of four pixels $m_0$, $m_1$, $m_2$, and $m_3$ to each show lower brightness than the original brightness. The pixel comparison weight calculation unit 702 performs processing equivalent to that performed by the pixel comparison weight calculation unit 602. The pixel value modification unit 701 lowers brightness of pixels $m_0$, $m_1$, $m_2$, and $m_3$, thus increasing brightness of pixel n relatively. Accordingly, the weight of a pixel having higher brightness among pixels $m_0$, $m_1$, $m_2$, and $m_3$ is increased.

In the example in FIG. 7, pixel values of the intermediate image have relatively high brightness. Accordingly, multiplication coefficients obtained by subsequent processing are generated being influenced more by pixel values of pixels located on a bright side of the boundary between bright and dark portions of the original image, than by pixel values of pixels located on a dark side of the boundary between bright and dark portions of the original image.

Next, the spatial weight calculation unit 502 calculates weights in accordance with a spatial distance between pixel n of the intermediate image and pixel $m_k$ (k is 0 to 3) of the reduced image. Here, the greater a spatial distance is, the smaller a weight is which is calculated in accordance with the spatial distance. For example, the spatial weight calculation unit 502 calculates weights (spatial weights) using Expression 5.

$$W_s(k) = (1-\alpha(k)) \times (1-\beta(k)) \quad \text{(Expression 5)}$$

In Expression 5, the size of one pixel of the reduced image corresponds to 1, $\alpha(k)$ denotes a horizontal distance between a relative position of the center of pixel n in the intermediate image and a relative position of the center of pixel $m_k$ in the reduced image. $\beta(k)$ denotes a vertical distance between a relative position of the center of pixel n in the intermediate image and a relative position of the center of pixel $m_k$ in the reduced image. $W_s(k)$ denotes a spatial weight of pixel $m_k$.

The spatial weight calculation unit 502 calculates spatial weights such that the greater a spatial distance is, the smaller a spatial weight is. A calculating method used by the spatial weight calculation unit 502 to calculate spatial weights is not limited to such a calculating method.

Next, the weight combining unit 503 combines pixel weight $W_p(k)$ calculated by the pixel weight calculation unit 501 and spatial weight $W_s(k)$ calculated by the spatial weight calculation unit 502, to calculate a final weight corresponding to pixel $m_k$.

For example, the weight combining unit 503 multiplies pixel weight $W_p(k)$ and spatial weight $W_s(k)$, to calculate a weight corresponding to pixel $m_k$. Alternatively, the weight combining unit 503 may add pixel weight $W_p(k)$ and spatial weight $W_s(k)$ to calculate a weight corresponding to pixel $m_k$, as another weight combining method.

Following the above procedure, the weight calculation unit 401 calculates, for each pixel of the intermediate image, four weights of four reference pixels of the reduced image. In this manner, the weight calculation unit 401 calculates weights the number of which is obtained by multiplying the number of pixels of the intermediate image and the number of reference pixels.

In other words, the weight calculation unit 401 calculates four weights per pixel of the intermediate image. For example, if the weighted averaging unit 402 outputs multiplication coefficients for 480×270 pixels, the weight calculation unit 401 calculates weights for 480×270×4 pixels. Then, the weight calculation unit 401 outputs the calculated weights to the weighted averaging unit 402.

The weighted averaging unit 402 performs weighted averaging on multiplication coefficients, based on the weights calculated by the weight calculation unit 401. Specifically, the weighted averaging unit 402 performs, using four weights, weighted averaging of four multiplication coefficients corresponding to 2×2 pixels of the reduced image, to calculate a multiplication coefficient corresponding to one pixel of the intermediate image. Then, the weighted averaging unit 402 calculates a multiplication coefficient for each pixel of the intermediate image, and outputs calculated multiplication coefficients as multiplication coefficients corresponding to pixels of the intermediate image.

It should be noted that although reference pixels are 2×2 pixels in the above operation, reference pixels may be increased to 4×4 pixels or 8×8 pixels. The image processing device 100 can change, in a spatially smoother manner, multiplication coefficients which have been enlarged, by increasing the number of reference pixels.

[1-2. Supplementary Description]

As described above, the image processing device 100 according to the present embodiment includes the image obtaining unit 101, the reduced image generation unit 102, the multiplication coefficient generation unit 103, the first enlargement unit 104, the second enlargement unit 105, and the image correction unit 106. The first enlargement unit 104 and the second enlargement unit 105 form the bright portion priority enlargement unit 110.

The image obtaining unit 101 obtains an original image. The reduced image generation unit 102 reduces an original image to generate a reduced image. The reduced image has resolution lower than the resolution of the original image. The multiplication coefficient generation unit 103 calculates, for each pixel of the reduced image, a multiplication coefficient by which a pixel value of a current pixel to be processed is multiplied, such that the brighter a portion surrounding the current pixel is, the smaller the multiplication coefficient is, and the darker a portion surrounding the current pixel is, the greater the multiplication coefficient is. Then, the multiplication coefficient generation unit 103 calculates multiplication coefficients corresponding to pixels of the reduced image.

The bright portion priority enlargement unit 110 enlarges the calculated multiplication coefficients, to calculate multiplication coefficients corresponding to pixels of the original image. The image correction unit 106 multiplies, for each pixel of the original image, a multiplication coefficient corresponding to the pixel by the pixel value of the pixel, to correct the original image.

Then, among the multiplication coefficients which have been enlarged, a multiplication coefficient corresponding to a pixel located near a boundary between bright and dark portions of the original image is generated being influenced more by a pixel value of a pixel located on a bright side of the boundary between bright and dark portions of the original image, than by a pixel value of a pixel located on a dark side of the boundary between bright and dark portions of the original image.

The bright portion priority enlargement unit 110 according to the present embodiment may change pixel values of (1) the original image or (2) the intermediate image to have higher brightness, and enlarge multiplication coefficients corresponding to the reduced image, using the changed pixel values. Furthermore, the bright portion priority enlargement unit 110 according to the present embodiment may change pixel values of (1) the reduced image or (2) the intermediate image to have lower brightness, and enlarge multiplication coefficients corresponding to the reduced image, using the changed pixel value.

The intermediate image is an image obtained by reducing the original image, and larger than the reduced image and smaller than the original image. More specifically, a resolution of the intermediate image is lower than a resolution of the original image, and higher than a resolution of the reduced image.

If the bright portion priority enlargement unit 110 enlarges multiplication coefficients corresponding to the reduced image in one step, to calculate multiplication coefficients corresponding to the original image, the bright portion priority enlargement unit 110 uses (1) above. If the bright portion priority enlargement unit 110 enlarges multiplication coefficients corresponding to the reduced image in a plurality of steps, to calculate multiplication coefficients corresponding to the original image, the bright portion priority enlargement unit 110 may use (1) or (2) above. [1-3. Advantageous Effects and Others]

Multiplication coefficients corresponding to pixels of the reduced image are generated, and enlarged to multiplication coefficients corresponding to pixels of the original image. As a result, multiplication coefficients corresponding to pixels of the original image are generated efficiently.

Among multiplication coefficients corresponding to the original image, multiplication coefficients for the bright side (bright portion) of the boundary between bright and dark portions of the original image are influenced by pixel values on the dark side (dark portion) of the original image in the generation and enlargement processes. Furthermore, among multiplication coefficients corresponding to the original image, multiplication coefficients for the dark side of the boundary between bright and dark portions of an original image are influenced by pixel values for the bright side of the original image in the generation and enlargement processes.

Accordingly, multiplication coefficients for the bright side of the boundary between bright and dark portions are increased. Thus, excessive correction raises the brightness on the bright side of the boundary between bright and dark portions more than intended. Furthermore, multiplication coefficients for the dark side of the boundary between bright and dark portions are decreased. Thus, insufficient correction lowers the brightness on the dark side of the boundary between bright and dark portions more than intended. This phenomenon is called "halo", and causes extremely noticeable deterioration in image quality.

This phenomenon occurs due to calculating multiplication coefficients corresponding to pixels of the reduced image of the original image, and enlarging the calculated multiplication coefficients to multiplication coefficients corresponding to pixels of the original image.

Figure 8:
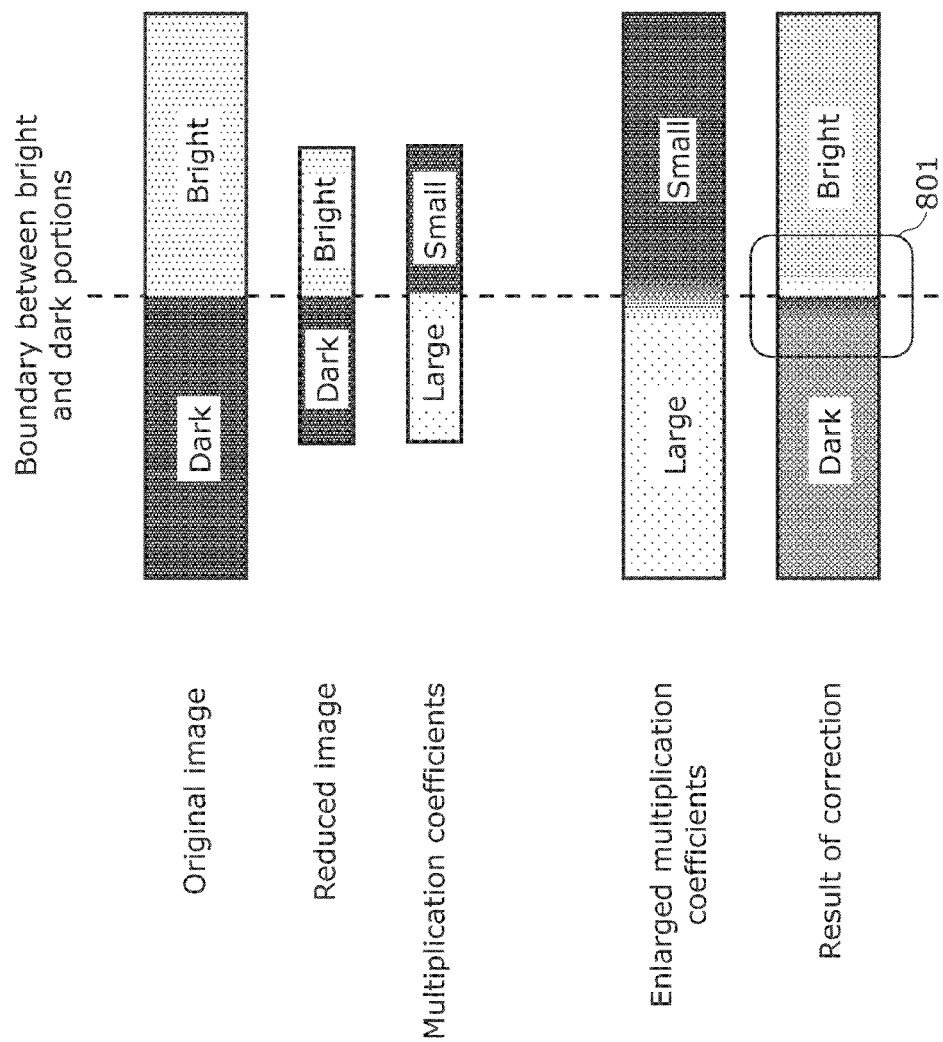
FIG. 8 illustrates correction with no priority given to a bright portion.

FIG. 8 illustrates correction without giving priority to a bright portion, and an example in which a halo has occurred. As illustrated in FIG. 8, the reduced image is generated by reducing the original image. Then, multiplication coefficients that are the same in number as pixels of the reduced image are generated based on the reduced image. After that, the multiplication coefficients that are the same in number as the pixels of the reduced image are enlarged (interpolated) to generate multiplication coefficients that are the same in number as pixels of the original image.

The multiplication coefficients corresponding to the pixels of the original image are influenced by dark side pixels, on the bright side near the boundary between bright and dark portions of the original image, and influenced by bright side pixels, on the dark side near the boundary between bright and dark portions of the original image. In this manner, a great multiplication coefficient is generated on the bright side near the boundary between bright and dark portions of the original image, and a small multiplication coefficient is generated on the dark side near the boundary between bright and dark portions of the original image. If correction processing is performed using such a multiplication coefficient, as shown by the result of correction in FIG. 8, the bright portion has still higher brightness and a dark portion has further less brightness, in an area 801 about the boundary between bright and dark portions.

Figure 9:
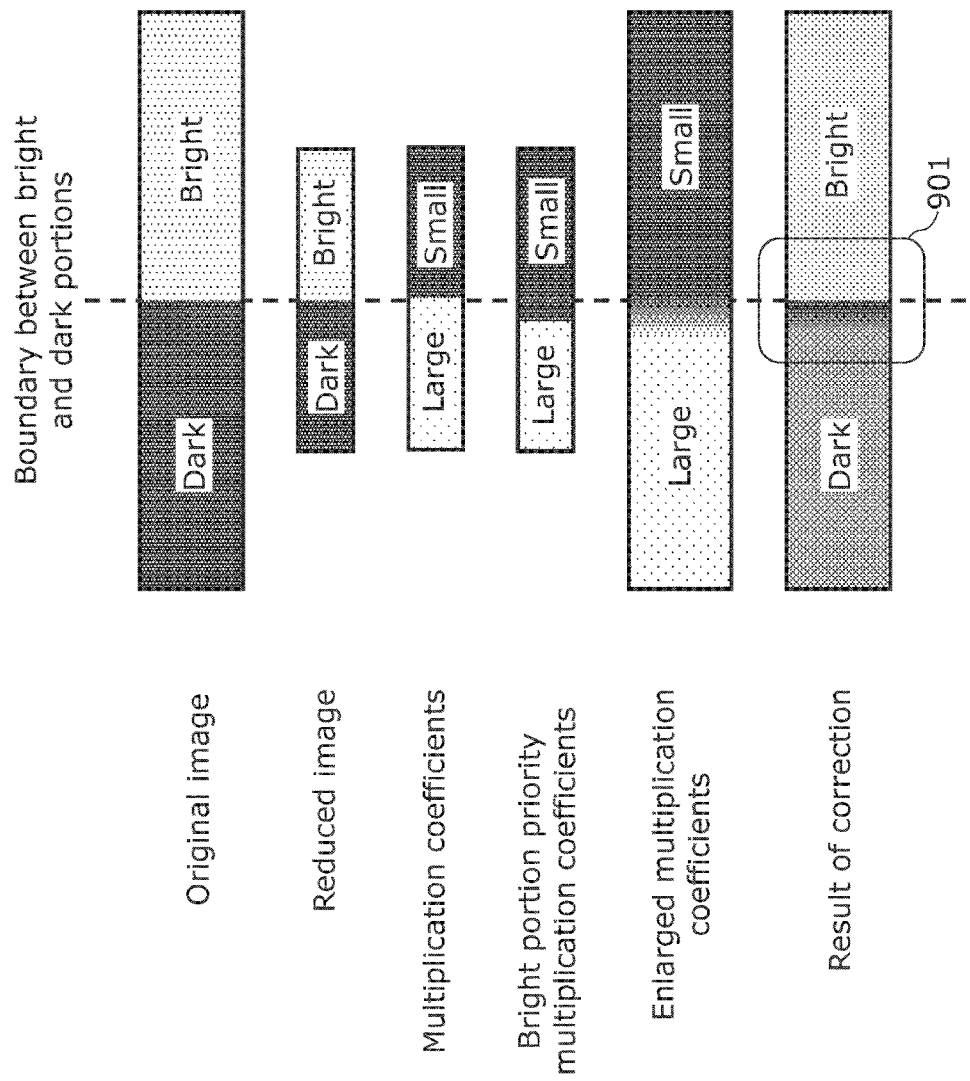
FIG. 9 illustrates correction with priority given to a bright portion.

FIG. 9 illustrates correction with priority given to a bright portion, and an example in which a halo is inhibited. The first enlargement unit 104 performs enlargement processing, giving priority to a bright portion defined by a boundary between bright and dark portions, thus spreading multiplication coefficients of the bright portion to a dark side and generating multiplication coefficients (bright portion priority multiplication coefficients). The second enlargement unit 105 enlarges the bright portion priority multiplication coefficients to multiplication coefficients that are the same in number as the pixels of the original image, thus preventing an excessively large multiplication coefficient from being generated in the bright portion.

Consequently, the image processing device 100 can greatly reduce a halo on a bright side in an area 901 about the boundary between bright and dark portions, in an image obtained as a result of correction. On the contrary, a halo on the dark side increases. However, a halo on the dark side is less noticeable compared with a halo on the bright side. Accordingly, a halo is greatly inhibited as a whole.

In a process of calculating multiplication coefficients corresponding in number to pixels of the original image, the image processing device 100 according to the present embodiment increases influence of a pixel value of a pixel located on the bright side of the boundary between bright and dark portions of the original image than influence of a pixel value of a pixel located on the dark side of the boundary between bright and dark portions of the original image. This allows the image processing device 100 to inhibit a halo.

Figure 10:
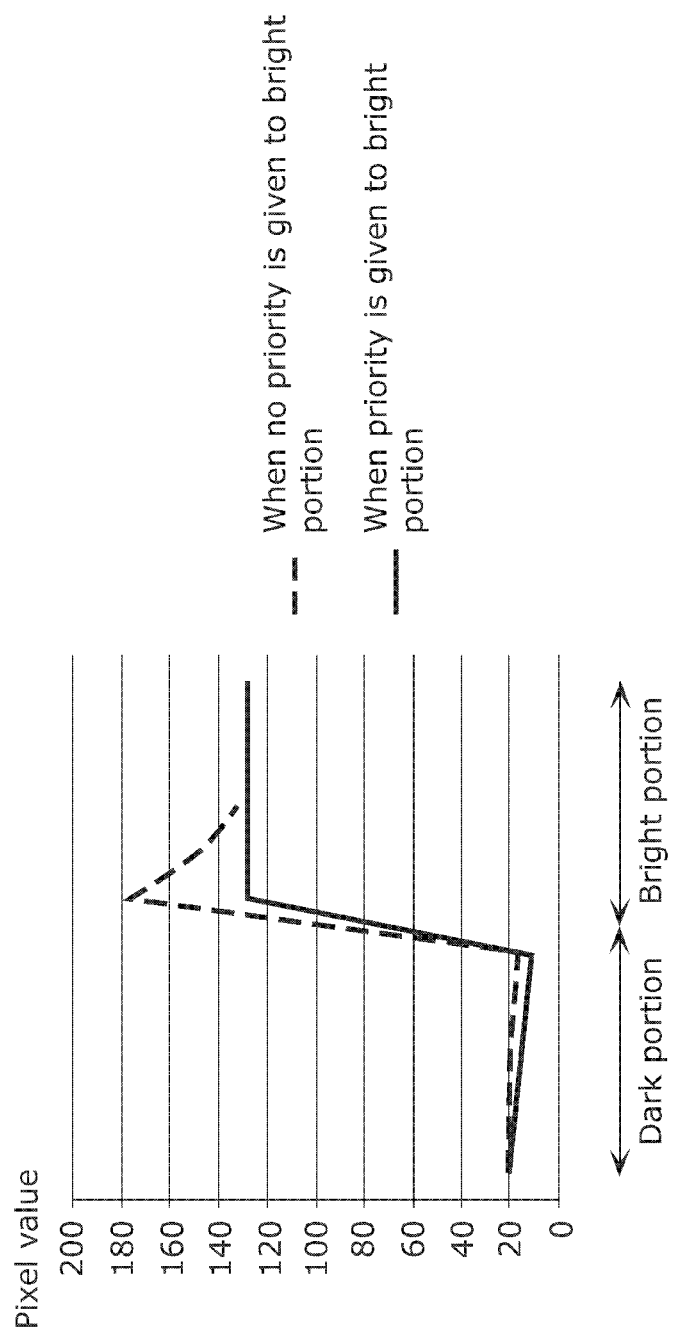
FIG. 10 illustrates a comparison between correction with no priority given to a bright portion and correction with priority given to a bright portion.

FIG. 10 illustrates a comparison between correction with no priority given to a bright portion and correction with priority given to a bright portion. In FIG. 10, a correction result of processing with no priority given to a bright portion as shown in FIG. 8, and a correction result of processing with priority given to a bright portion as shown in FIG. 9 are plotted.

A pixel value is corrected by multiplying a pixel value by a multiplication coefficient, as described above. The greater a pixel value is, the more a multiplication result is changed due to a change in a multiplication coefficient, whereas the smaller a pixel value is, the less a multiplication result is changed due to a change in a multiplication coefficient. Accordingly, if processing with priority given to a bright portion is not performed, a halo in a bright portion is large, whereas a halo in a dark portion is small. Then, processing with priority given to a bright portion is performed, thus greatly reducing a halo in a bright portion, and slightly increasing a halo in a dark portion.

Accordingly, the image processing device 100 performs processing with priority given to a bright portion, thus greatly reducing a halo in a bright portion while inhibiting an increase in a halo in a dark portion.

The above operation allows the image processing device 100 to achieve both reduction in the amount of processing of generating coefficients for correcting an original image and inhibition of deterioration in image quality caused by the reduction in the amount of processing.

Embodiment 2

Figure 11:
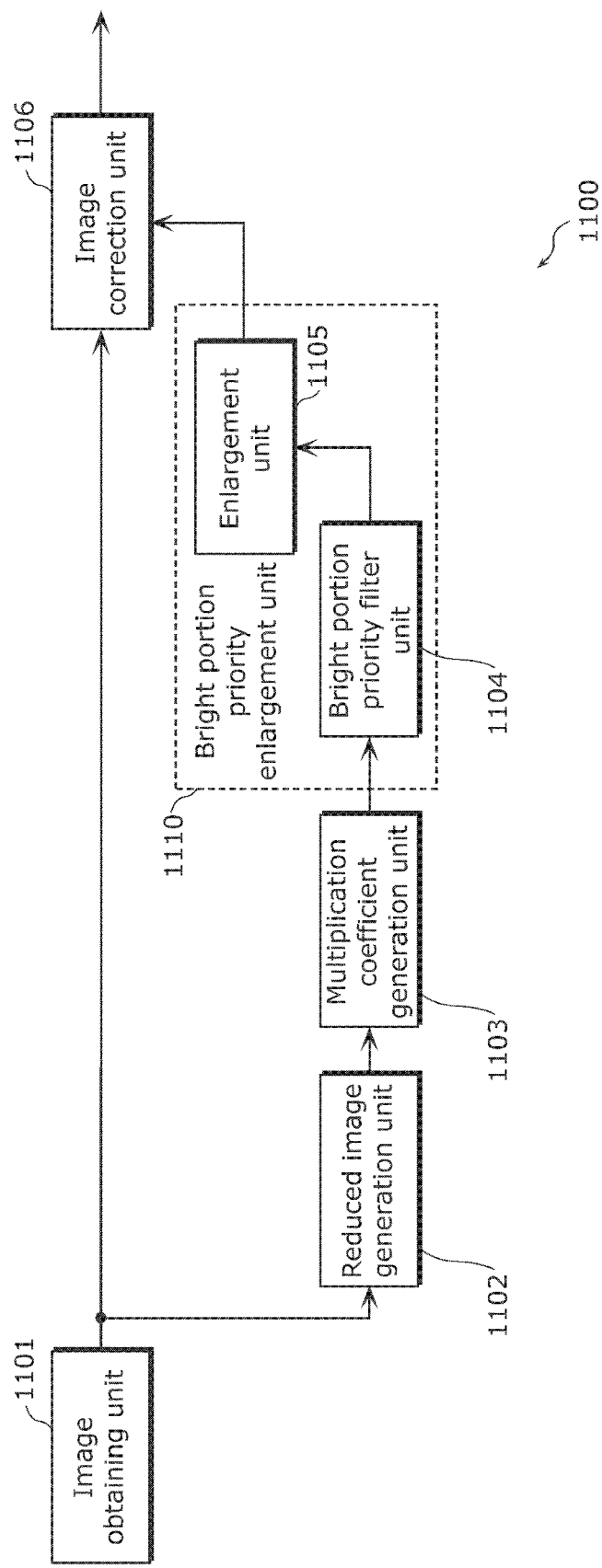
FIG. 11 is a configuration diagram illustrating a specific example of an image processing device according to Embodiment 2.
Figure 12:
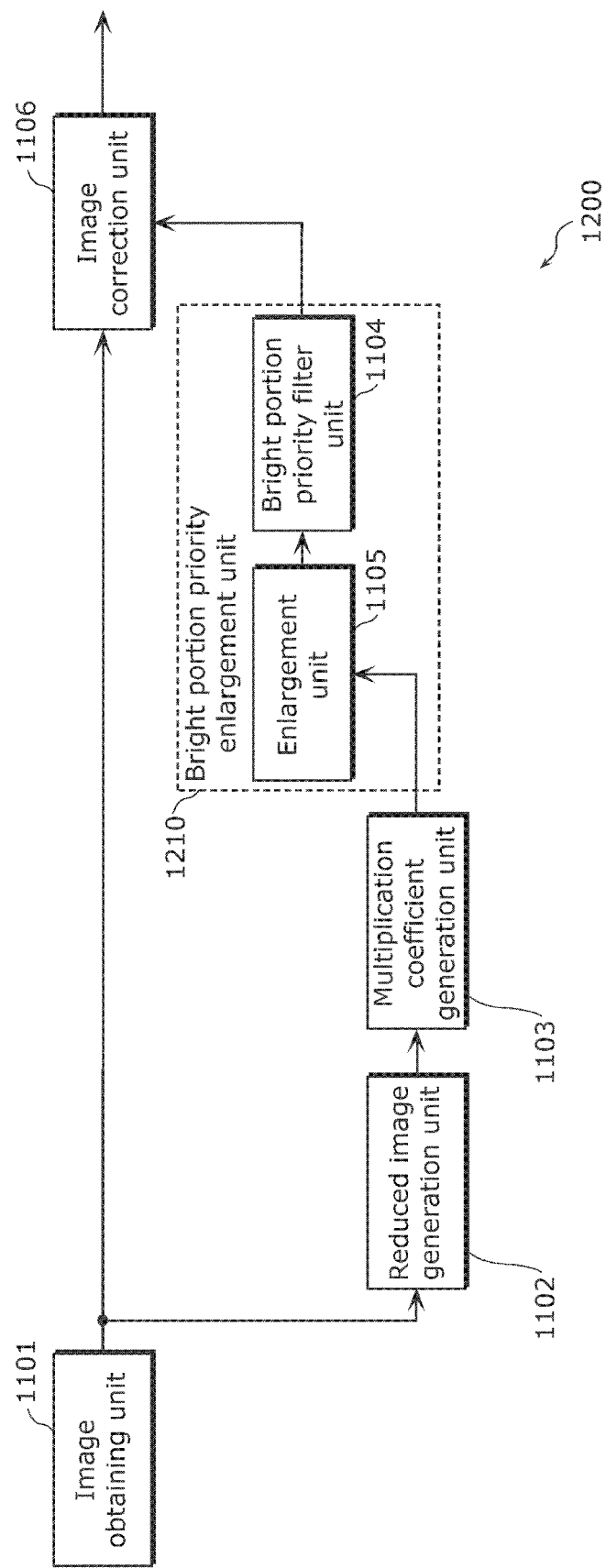
FIG. 12 is a configuration diagram illustrating a variation of the image processing device according to Embodiment 2.

The following describes a present non-limiting embodiment with reference to FIGS. 11 and 12.

[2-1. Configuration]

FIG. 11 is a configuration diagram illustrating a specific example of an image processing device according to the present embodiment. An image processing device 1100 illustrated in FIG. includes an image obtaining unit 1101, a reduced image generation unit 1102, a multiplication coefficient generation unit 1103, a bright portion priority filter unit 1104, an enlargement unit 1105, and an image correction unit 1106. The bright portion priority filter unit 1104 and the enlargement unit 1105 form a bright portion priority enlargement unit 1110. The bright portion priority enlargement unit 1110 may be expressed as an expansion unit.

The image obtaining unit 1101, the reduced image generation unit 1102, the multiplication coefficient generation unit 1103, and the image correction unit 1106 correspond to the image obtaining unit 101, the reduced image generation unit 102, the multiplication coefficient generation unit 103, and the image correction unit 106 according to Embodiment 1, respectively. Furthermore, the bright portion priority enlargement unit 1110 corresponds to the bright portion priority enlargement unit 110 according to Embodiment 1.

The image obtaining unit 1101 obtains an image as an original image. For example, the image obtaining unit 1101 obtains an original image from a recording medium connected to the image processing device 1100.

The reduced image generation unit 1102 reduces an image. For example, the reduced image generation unit 1102 reduces the number of pixels of the original image obtained by the image obtaining unit 1101, to generate a reduced image.

Specifically, the reduced image generation unit 1102 performs low pass filter processing and subsampling processing, to generate a reduced image having no aliasing. For example, if the original image includes 1920×1080 pixels, the reduced image generation unit 1102 reduces this original image to an image having ¼ pixels both horizontally and vertically.

It should be noted that when generating the reduced image, the reduced image generation unit 1102 may generate a reduced image having the same aspect ratio as that of the original image, or may generate the reduced image having an aspect ratio other than this. In other words, a designer can freely set the number of pixels and an aspect ratio of a reduced image.

The reduced image generation unit 1102 outputs the reduced image obtained by reducing the original image, to the multiplication coefficient generation unit 1103.

The multiplication coefficient generation unit 1103 is a generation unit which generates multiplication coefficients. Specifically, the multiplication coefficient generation unit 1103 calculates, for each pixel of the reduced image, a multiplication coefficient based on a pixel value of the pixel and a pixel value of a pixel located in a portion surrounding the pixel, to generate multiplication coefficients corresponding to pixels of the reduced image.

It should be noted that the multiplication coefficient generation unit 1103 further reduces a first reduced image that is a reduced image generated by the reduced image generation unit 1102, to generate a second reduced image. Then, the multiplication coefficient generation unit 1103 may calculate multiplication coefficients corresponding to pixels of the second reduced image. Then, the multiplication coefficient generation unit 1103 performs enlargement processing on the multiplication coefficients corresponding to the pixels of the second reduced image, to generate multiplication coefficients corresponding to pixels of the first reduced image.

The bright portion priority filter unit 1104 performs, on multiplication coefficients corresponding to pixels of the reduced image, filter processing for preferentially adopting a multiplication coefficient for a bright portion defined by a boundary between bright and dark portions in the reduced image.

Specifically, referring to a multiplication coefficient of a current pixel to be processed and a multiplication coefficient at an adjacent pixel position, the bright portion priority filter unit 1104 outputs a multiplication coefficient equal to or smaller than the multiplication coefficient of the current pixel, as a multiplication coefficient of the current pixel. For example, the bright portion priority filter unit 1104 outputs the smallest multiplication coefficient as a multiplication coefficient of the current pixel, among multiplication coefficients which have been referred to.

In this manner, the bright portion priority filter unit 1104 can exert, to a multiplication coefficient, greater influence of a pixel value of a pixel located on the bright side of the boundary between bright and dark portions of the original image, than the influence of a pixel value of a pixel located on the dark side of the boundary between bright and dark portions of the original image.

Furthermore, as another method, the bright portion priority filter unit 1104 may calculate a greater weight for a pixel having a greater pixel value, namely, a pixel having higher brightness, based on a pixel value of a current pixel to be processed of the reduced image and pixel values of pixels adjacent to the current pixel of the reduced image. The bright portion priority filter unit 1104 may perform weighted averaging on the multiplication coefficient of the current pixel and multiplication coefficients of pixels adjacent to the current pixel, based on the calculated weights.

The enlargement unit 1105 enlarges multiplication coefficients corresponding to pixels of the reduced image, to generate, for each pixel of the original image, a multiplication coefficient for correcting a pixel value of the pixel of the original image. In this manner, the enlargement unit 1105 generates multiplication coefficients corresponding to pixels of the original image.

The image correction unit 1106 is a correction unit which corrects the original image. The image correction unit 1106 corrects pixel values of the original image using multiplication coefficients corresponding to the original image, to generate an image having corrected pixel values.

It should be noted that the bright portion priority filter unit 1104 may be located downstream of the enlargement unit 1105, as illustrated in FIG. 12.

FIG. 12 is a configuration diagram illustrating a variation of the image processing device 1100 illustrated in FIG. 11. An image processing device 1200 illustrated in FIG. 12 includes the image obtaining unit 1101, the reduced image generation unit 1102, the multiplication coefficient generation unit 1103, the bright portion priority filter unit 1104, the enlargement unit 1105, and the image correction unit 1106.1 The bright portion priority filter unit 1104 and the enlargement unit 1105 form a bright portion priority enlargement unit 1210. The bright portion priority enlargement unit 1210 may be expressed as an expansion unit.

The image obtaining unit 1101, the reduced image generation unit 1102, the multiplication coefficient generation unit 1103, the bright portion priority filter unit 1104, the enlargement unit 1105, and the image correction unit 1106 of the image processing device 1200 are all equivalent to constituent elements of the image processing device 1100. The image processing device 1200 includes the bright portion priority filter unit 1104 and the enlargement unit 1105 the order of which is changed from that of the image processing device 1100.

In other words, the image processing device 1100 applies a filter to multiplication coefficients corresponding to pixels of the reduced image, whereas the image processing device 1200 applies a filter to multiplication coefficients corresponding to pixels of the original image. A specific operation of a filter is the same as that in the case of the image processing device 1100.

As with the image processing device 1100, the image processing device 1200 can exert, to a multiplication coefficient, greater influence of a pixel value of a pixel located on a bright side of a boundary between bright and dark portions of the original image than the influence of a pixel value of a pixel located on a dark side of a boundary between bright and dark portions of the original image.

[2-2. Supplementary Description]

As described above, the image processing device 1100 and the image processing device 1200 according to the present embodiment include the image obtaining unit 1101, the reduced image generation unit 1102, the multiplication coefficient generation unit 1103, the bright portion priority filter unit 1104, the enlargement unit 1105, and the image correction unit 1106. The bright portion priority filter unit 1104 and the enlargement unit 1105 form the bright portion priority enlargement unit 1110 or the bright portion priority enlargement unit 1210.

The image obtaining unit 1101 obtains an original image. The reduced image generation unit 1102 reduces the number of pixels of the original image, to generate a reduced image. The multiplication coefficient generation unit 1103 generates a multiplication coefficient for each pixel of the reduced image, based on a pixel value of the pixel of the reduced image and a pixel value of a pixel located in a portion surrounding the pixel of the reduced image, to generate multiplication coefficients corresponding to pixels of the reduced image.

The enlargement unit 1105 generates multiplication coefficients corresponding to pixels of the original image, based on the multiplication coefficients corresponding to pixels of the reduced image. The image correction unit 1106 corrects pixel values of the original image, using the multiplication coefficients corresponding to pixels of the original image, to generate an image having corrected pixel values.

The bright portion priority filter unit 1104 performs bright portion priority filter processing on multiplication coefficients which have been enlarged or multiplication coefficients which have not been enlarged. Specifically, the bright portion priority filter unit 1104 performs bright portion priority filter processing on the multiplication coefficients corresponding to the reduced image, the original image, or an intermediate image. Bright portion priority filter processing is filter processing in which priority is given to a multiplication coefficient for a bright portion among multiplication coefficients, with reference to multiplication coefficients corresponding to a current pixel to be processed and a pixel in a portion surrounding the current pixel.

Specifically, the bright portion priority filter unit 1104 performs bright portion priority filter processing on the multiplication coefficients corresponding to the reduced image or multiplication coefficients obtained by enlarging the multiplication coefficients corresponding to the reduced image. Then, the bright portion priority filter unit 1104 performs bright portion priority filter processing, to update the multiplication coefficient corresponding to the current pixel, based on the multiplication coefficient corresponding to the current pixel and the multiplication coefficient corresponding to a pixel in the portion surrounding the current pixel.

More specifically, the bright portion priority filter unit 1104 updates the multiplication coefficient corresponding to the current pixel to the smallest one of the multiplication coefficients corresponding to the current pixel and the pixel in the portion surrounding the current pixel.

[2-3. Advantageous Effects and Others]

The image processing device 1100 and the image processing device 1200 according to the present embodiment directly update multiplication coefficients. In this manner, the image processing device 1100 and the image processing device 1200 can inhibit a halo in a bright portion, as with the image processing device 100 according to Embodiment 1.

Thus, the image processing device 1100 and the image processing device 1200 can achieve both reduction in the amount of processing of generating coefficients for correcting an original image and inhibition of deterioration in image quality caused by the reduction in the amount of processing.

CONCLUSION

As described above, the image processing device (the image processing device 100, 1100, 1200) according to the present disclosure corrects, on a pixel-by-pixel basis, the brightness of an original image which includes pixels having greater pixel values when the pixels have higher brightness. Specifically, for example, the image processing device corrects a dark portion or a bright portion. Furthermore, the image processing device includes a generation unit (the multiplication coefficient generation unit 103, 1103), an expansion unit (the bright portion priority enlargement unit 110, 1110, 1210), and a correction unit (the image correction unit 106, 1106).

The generation unit generates, for each pixel of a reduced image of the original image, a greater coefficient as a pixel in a portion surrounding the pixel is darker, to generate coefficients corresponding to pixels of the reduced image.

The expansion unit generates coefficients corresponding to pixels of the original image from the coefficients corresponding to pixels of the reduced image, to expand the coefficients corresponding to the pixels of the reduced image to the coefficients corresponding to the pixels of an original image. Specifically, the expansion unit generates coefficients corresponding to pixels of the original image such that a spatial change of the coefficients corresponding to the pixels of the original image is caused according to a boundary between bright and dark portions included in the original image, the spatial change occurring mainly on a dark side of the boundary.

The occurrence of a spatial change of the coefficients corresponding to pixels of the original image mainly on a dark side of the boundary between bright and dark portions means that a spatial change of coefficients corresponding to pixels of the original image occurs mostly on the dark side of the boundary between bright and dark portions, or in other words, a spatial change is shifted toward the dark side. For example, the amount of change in coefficients on the dark side may be greater than the amount of change on the bright side, the change being caused according to the boundary between bright and dark portions. Furthermore, for example, the center of an area where coefficients change according to the boundary between bright and dark portions may be located on the dark side.

The correction unit multiplies, for each pixel of the original image, a pixel value of the pixel by a coefficient corresponding to the pixel, to correct pixel values of pixels of the original image.

Figure 13:
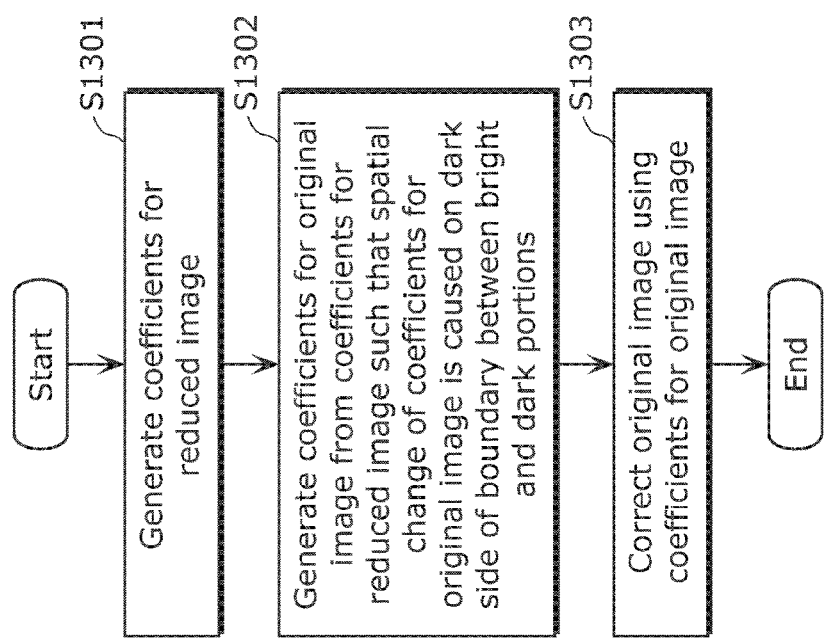
FIG. 13 is a flowchart showing operation of the image processing device according to Embodiments 1 and 2.

FIG. 13 is a flowchart showing operation of the image processing device according to the present disclosure. First, the generation unit generates coefficients corresponding to a reduced image of an original image (S1301). Next, the expansion unit generates coefficients corresponding to the original image from the coefficients corresponding to the reduced image such that a spatial change of the coefficients corresponding to the original image is caused on the dark side of a boundary between bright and dark portions (S1302). Finally, the correction unit corrects the original image using the coefficients corresponding to the original image (S1303).

In this manner, the image processing device can achieve both reduction in the amount of processing of generating coefficients for correcting an original image and inhibition of deterioration in image quality caused by the reduction in the amount of processing.

For example, the expansion unit may perform expansion processing one or more times on the coefficients corresponding to pixels of the reduced image. In the expansion processing, coefficients are expanded from coefficients corresponding to pixels of a first image to coefficients corresponding to pixels of a second image larger than the first image.

Then, in at least one of the one or more times extension processing is performed, the expansion unit may assign two or more weights to two or more pixels of the first image. The expansion unit may generate coefficients corresponding to pixels of the second image from two or more coefficients corresponding to two or more pixels of the first image, using two or more weights assigned to the two or more pixels of the first image.

When the expansion unit assigns two or more weights to two or more pixels of the first image, the expansion unit may assign a weight to each of the two or more pixels of the first image such that the smaller a difference between a pixel value of the pixel and a pixel value obtained by increasing a pixel value of a pixel of the second image is, the greater the weight is.

In addition, when the expansion unit assigns two or more weights to two or more pixels of the first image, the expansion unit may assign to each of the two or more pixels of the first image such that the smaller difference between a pixel value obtained by decreasing a pixel value of the pixel and a pixel value of a pixel of the second image is, the greater the weight is.

Furthermore, in at least one of the one or more times extension processing is performed, the expansion unit may update the coefficients corresponding to pixels of the first image, and generate coefficients corresponding to pixels of the second image from the updated coefficients. When the expansion unit updates the coefficients corresponding to pixels of the first image, the expansion unit may update, for each pixel of the first image, a coefficient corresponding to the pixel, in accordance with two or more coefficients corresponding to the pixel and one or more pixels in a portion surrounding the pixel.

At that time, the expansion unit may update, for each pixel of the first image, a coefficient corresponding to the pixel to the smallest one of two or more coefficients corresponding to the pixel and one or more pixels in a portion surrounding the pixel.

Further, in at least one of the one or more times extension processing is performed, the expansion unit may update coefficients corresponding to pixels of the second image, to generate updated coefficients. When the expansion unit updates coefficients corresponding to pixels of the second image, the expansion unit may update, for each pixel of the second image, a coefficient corresponding to the pixel, in accordance with two or more coefficients corresponding to the pixel and one or more pixels in a portion surrounding the pixel.

At that time, the expansion unit may update, for each pixel of the second image, a coefficient corresponding to the pixel to the smallest one of two or more coefficients corresponding to the pixel and one or more pixels in a portion surrounding the pixel.

It should be noted that the image processing device may selectively include a plurality of constituent elements according to the present disclosure, and the image processing method may selectively include a plurality of processes according to the present disclosure.

Furthermore, the constituent elements according to the present disclosure may be circuits. These circuits may form one circuit as a whole, or separate circuits. These circuits may be general-purpose circuits or dedicated circuits.

A computer may execute the processes according to the present disclosure. For example, a computer executes a program using hardware resources such as a processor (CPU), a memory, and an input output circuit, thus executing the processes according to the present disclosure. Specifically, a processor obtains data to be processed, from a memory or an input output circuit and calculates the data or outputs the calculation result to a memory or an input output circuit, to execute the processes.

A program for executing the processes according to the present disclosure may be stored in a non-transitory computer-readable recording medium such as a CD-ROM. In this case, the computer reads the program from the non-transitory recording medium and executes the program, to execute the processes.

The image processing device according to the present disclosure may be expressed as a spatial vision processing device. The image processing method according to the present disclosure may be expressed as a spatial vision processing method.

The above is a description of embodiments as examples of the technique according to the present disclosure. For this purpose, the accompanying drawings and detailed description are provided.

Therefore, the constituent elements illustrated in the accompanying drawings and described in the detailed description may include not only a constituent element necessary for addressing the problem, but a constituent element not essential for addressing the problem, in order to exemplify the above technique. Accordingly, because of a mere fact that such a non-essential constituent element is illustrated in the accompanying drawings and described in the detailed description, the non-essential constituent element should not be immediately determined to be required.

The embodiments described above are intended to exemplify the technique according to the present disclosure, and thus various changes, replacement, addition, and omission, for instance, can be made within the scope of claims and its equivalent.

INDUSTRIAL APPLICABILITY

The present disclosure is applicable to an image processing method for correcting the brightness of an original image on a pixel-by-pixel basis. Specifically, the present disclosure is applicable to image processing devices such as a liquid crystal display, a BD player, and a network player.

The invention claimed is:

1. An image processing method for correcting, on a pixel-by-pixel basis, brightness of an original image which includes pixels that have greater pixel values when the pixels have higher brightness, the image processing method comprising:
   (a) generating coefficients corresponding to pixels of a reduced image of the original image by generating a greater coefficient for each of the pixels of the reduced image when a portion surrounding the pixel of the reduced image is darker;
   (b) generating coefficients corresponding to the pixels of the original image from the coefficients corresponding to the pixels of the reduced image, to expand the coefficients corresponding to the pixels of the reduced image to the coefficients corresponding to the pixels of the original image; and
   (c) multiplying, for each of the pixels of the original image, a pixel value of the pixel of the original image by one of the coefficients corresponding to the pixel of the original image, to correct the pixel values of the pixels of the original image, wherein:
   in step (b), the coefficients corresponding to the pixels of the original image are generated such that a spatial change of the coefficients corresponding to the pixels of the original image is caused according to a boundary between a bright portion and a dark portion included in the original image, the spatial change occurring on an area having a center located on a dark side of the boundary,
   in step (b), the coefficients corresponding to the pixels of the reduced image are expanded to the coefficients corresponding to the pixels of the original image by performing, on the coefficients corresponding to the pixels of the reduced image one or more times, expansion processing of expanding coefficients from coefficients corresponding to pixels of a first image to coefficients corresponding to pixels of a second image larger than the first image, and
   in at least one of the one or more times the expansion processing is performed,
   (i) two or more weights are assigned to two or more of the pixels of the first image by assigning a weight to each of the two or more of the pixels of the first image such that the smaller a difference between a pixel value of the pixel of the first image and a pixel value obtained by increasing a pixel value of one of the pixels of the second image is, the greater the weight is, and
   (ii) among the coefficients corresponding to the pixels of the second image, a coefficient corresponding to the one of the pixels of the second image is generated from two or more coefficients corresponding to the two or more of the pixels of the first image among the coefficients corresponding to the pixels of the first image, using the two or more weights assigned to the two or more of the pixels of the first image.

2. An image processing method for correcting, on a pixel-by-pixel basis, brightness of an original image which includes pixels that have greater pixel values when the pixels have higher brightness, the image processing method comprising:
   (a) generating coefficients corresponding to pixels of a reduced image of the original image by generating a greater coefficient for each of the pixels of the reduced image when a portion surrounding the pixel of the reduced image is darker;
   (b) generating coefficients corresponding to the pixels of the original image from the coefficients corresponding to the pixels of the reduced image, to expand the coefficients corresponding to the pixels of the reduced image to the coefficients corresponding to the pixels of the original image; and
   (c) multiplying, for each of the pixels of the original image, a pixel value of the pixel of the original image by one of the coefficients corresponding to the pixel of the original image, to correct the pixel values of the pixels of the original image, wherein:
   in step (b), the coefficients corresponding to the pixels of the original image are generated such that a spatial change of the coefficients corresponding to the pixels of the original image is caused according to a boundary between a bright portion and a dark portion included in the original image, the spatial change occurring on an area having a center located on a dark side of the boundary,
   in step (b), the coefficients corresponding to the pixels of the reduced image are expanded to the coefficients corresponding to the pixels of the original image by performing, on the coefficients corresponding to the pixels of the reduced image one or more times, expansion processing of expanding coefficients from coefficients corresponding to pixels of a first image to coefficients corresponding to pixels of a second image larger than the first image, and
   in at least one of the one or more times the expansion processing is performed,
   (i) two or more weights are assigned to two or more of the pixels of the first image by assigning a weight to each of the two or more of the pixels of the first image such that the smaller a difference between a pixel value obtained by decreasing a pixel value of the pixel of the first image and a pixel value of one of the pixels of the second image is, the greater the weight is, and (ii) among the coefficients corresponding to the pixels of the second image, a coefficient corresponding to the one of the pixels of the second image is generated from two or more coefficients corresponding to the two or more of the pixels of the first image among the coefficients corresponding to the pixels of the first image, using the two or more weights assigned to the two or more of the pixels of the first image.

3. An image processing device for correcting, on a pixel-by-pixel basis, brightness of an original image which includes pixels that have greater pixel values when the pixels have higher brightness, the image processing device comprising:

a non-transitory computer-readable recording medium storing a program; and a processor, wherein the program, when executed by the processor, causes the processor to perform:

generating coefficients corresponding to pixels of a reduced image of the original image by generating a greater coefficient for each of the pixels of the reduced image when a portion surrounding the pixel of the reduced image is darker;

generating coefficients corresponding to the pixels of the original image from the coefficients corresponding to the pixels of the reduced image, and expanding the coefficients corresponding to the pixels of the reduced image to the coefficients corresponding to the pixels of the original image; and multiplying, for each of the pixels of the original image, a pixel value of the pixel of the original image by one of the coefficients corresponding to the pixel of the original image, and correcting pixel values of the pixels of the original image, wherein the coefficients corresponding to the pixels of the original image is generated such that a spatial change of the coefficients corresponding to the pixels of the original image is caused according to a boundary between a bright portion and a dark portion included in the original image, the spatial change occurring on an area having a center located on a dark side of the boundary, the coefficients corresponding to the pixels of the reduced image is expanded to the coefficients corresponding to the pixels of the original image by performing, on the coefficients corresponding to the pixels of the reduced image one or more times, expansion processing of expanding coefficients from coefficients corresponding to pixels of a first image to coefficients corresponding to pixels of a second image larger than the first image, and the program further causes the processor to perform:

in at least one of the one or more times the expansion processing is performed, (i) assigning two or more weights to two or more of the pixels of the first image by assigning a weight to each of the two or more of the pixels of the first image such that the smaller a difference between a pixel value of the pixel of the first image and a pixel value obtained by increasing a pixel value of one of the pixels of the second image is, the greater the weight is, and (ii) among the coefficients corresponding to the pixels of the second image, generating a coefficient corresponding to the one of the pixels of the second image from two or more coefficients corresponding to the two or more of the pixels of the first image among the coefficients corresponding to the pixels of the first image, using the two or more weights assigned to the two or more of the pixels of the first image.

4. An image processing device for correcting, on a pixel-by-pixel basis, brightness of an original image which includes pixels that have greater pixel values when the pixels have higher brightness, the image processing device comprising:

a non-transitory computer-readable recording medium storing a program; and a processor, wherein the program, when executed by the processor, causes the processor to perform:

generating coefficients corresponding to pixels of a reduced image of the original image by generating a greater coefficient for each of the pixels of the reduced image when a portion surrounding the pixel of the reduced image is darker;

generating coefficients corresponding to the pixels of the original image from the coefficients corresponding to the pixels of the reduced image, and expanding the coefficients corresponding to the pixels of the reduced image to the coefficients corresponding to the pixels of the original image; and multiplying, for each of the pixels of the original image, a pixel value of the pixel of the original image by one of the coefficients corresponding to the pixel of the original image, and correcting pixel values of the pixels of the original image, wherein:

the coefficients corresponding to the pixels of the original image is generated such that a spatial change of the coefficients corresponding to the pixels of the original image is caused according to a boundary between a bright portion and a dark portion included in the original image, the spatial change occurring on an area having a center located on a dark side of the boundary, the coefficients corresponding to the pixels of the reduced image is expanded to the coefficients corresponding to the pixels of the original image by performing, on the coefficients corresponding to the pixels of the reduced image one or more times, expansion processing of expanding coefficients from coefficients corresponding to pixels of a first image to coefficients corresponding to pixels of a second image larger than the first image, and the program further causes the processor to perform:

in at least one of the one or more times the expansion processing is performed, (i) assigning two or more weights to two or more of the pixels of the first image by assigning a weight to each of the two or more of the pixels of the first image such that the smaller a difference between a pixel value obtained by decreasing a pixel value of the pixel of the first image and a pixel value of one of the pixels of the second image is, the greater the weight is, and (ii) among the coefficients corresponding to the pixels of the second image, generating a coefficient corresponding to the one of the pixels of the second image from two or more coefficients corresponding to the two or more of the pixels of the first image among the coefficients corresponding to the pixels of the first image, using the two or more weights assigned to the two or more of the pixels of the first image.

* * * * *